United States Patent [19]
Gerhardt

[11] Patent Number: 4,582,276
[45] Date of Patent: Apr. 15, 1986

[54] LIFTING SHOCK WAVE CANCELLATION MODULE

[75] Inventor: Heinz A. A. Gerhardt, Redondo Beach, Calif.

[73] Assignee: Northrop Corporation, Hawthorne, Calif.

[21] Appl. No.: 570,401

[22] Filed: Dec. 27, 1983

Related U.S. Application Data

[63] Continuation of Ser. No. 335,265, Dec. 28, 1981, abandoned.

[51] Int. Cl.$^4$ .............................................. B64C 1/00
[52] U.S. Cl. ................................... 244/119; 244/130; 244/35 A; 244/198
[58] Field of Search ............... 244/13, 15, 1 N, 45 R, 244/35 A, 119, 117 R, 130, 91, 198, 53 B, 36

[56] References Cited

U.S. PATENT DOCUMENTS

| 3,137,460 | 6/1964 | Owl, Jr. et al. | 244/15 |
| 3,942,746 | 3/1976 | Carter et al. | 244/13 |
| 4,243,188 | 1/1981 | DeBlois | 244/91 |

FOREIGN PATENT DOCUMENTS

945470 11/1948 France .............................. 244/35 A

OTHER PUBLICATIONS

Liepmann et al., *Elements of Gasdynamics,* "Waves in Supersonic Flow, §4.19 Drug Reduction", May 1967, pp. 115–118.

*Primary Examiner*—Galen L. Barefoot
*Assistant Examiner*—Rodney Corl
*Attorney, Agent, or Firm*—Terry J. Anderson; Robert B. Block

[57] ABSTRACT

An aerodynamic structure which when included into the design of a supersonic aircraft provides the aircraft with a higher lift/drag ratio than has been obtainable previously in supersonic aircraft design. In a preferred embodiment, the aerodynamic structure has the general shape of a modified U-channel with each of the legs of the U-channel being configured in cross section as an isosceles triangle and extending from a cross plate. The vertical apices of each triangle face each other and are separated so that shock waves originating from the leading edges of the aerodynamic structures are cancelled by expansion waves being generated from the vertical apices. At supersonic speeds lift of the aircraft is created by a pressure field generated by a shock-expansion system acting on the cross plate of the U-channel.

10 Claims, 4 Drawing Figures

LIFTING SHOCK WAVE CANCELLATION MODULE

This is a continuation of Ser. No. 335,265 filed Dec. 28, 1981, now abandoned.

BACKGROUND OF THE INVENTION

1. Field of the Invention

The present invention relates to the field of aircraft and more particularly to the design of an aerodynamic structure which when incorporated in the design of a supersonic aircraft increases the lift/drag ratio.

2. Description of the Prior Art

Aircraft of generally conventional design and shape obtain lift from the airflow over the wing surface thereof. The amount of lift depends upon the plan form and contour of the surface, the speed of the aircraft, and its angle of attack. Drag in a conventional design is, simply stated, a resistive force exerted in a direction opposite to the direction of motion and parallel to the relative air stream.

Aircraft designed for effective flight at supersonic speeds depend traditionally on maintaining subsonic-type air flow past the wings and on minimizing wave drag over the fuselage thereof. This approach results in aircraft configurations with very thin and highly swept wings and with extremely slender fuselages. The resultant structure places heavy penalties on weight, and the volume of the aircraft is severely restricted due to its being the prime generator of wave drag.

The present invention utilizes shock wave cancellation to achieve a substantial reduction in wave drag. At the same time, the pressure fields generated by the volume of the system provide lift in a more efficient way than prior art methods of providing lift by surface incidence.

Prior to the present invention, there was no aerodynamic shock wave cancellation structure which could be integrated into the design of a supersonic aircraft to improve the lift/drag ratio and thereby significantly increase the operational capabilities of the aircraft at design Mach Numbers.

PRIOR ART STATEMENT

A. Busemann's two-dimensional biplane studies are cited as the most pertinent prior art of which the applicant is aware. Reference to Busemann's biplane studies can be found in Elements of Gasdynamics by H. W. Liepmann and A. Roshko, published by John Wiley and Sons, Inc. New York. The Busemann biplane concept offers a potential for significant reduction in wave drag by what is commonly called "wave cancellation" since shock waves produced by one wing are cancelled by an expansion wave produced on the other wing. In its basic form, the Busemann biplane concept relates to a non-lifting system of infinite wing span. At off-design Mach Numbers, the shock cancellation is incomplete so that waves escape from the system and increased rather than decreased drag results. At low supersonic speeds, a detached shock wave stands out ahead of the wings and the biplane interior acts as a subsonic duct. In order to have the system operate properly, the detached shock wave must be swallowed while accelerating from low speed to design Mach Number. A necessary condition for this is that the flow must not choke at the throat. This represents a serious limitation for a biplane as it restricts the thickness of the wing to fairly low values.

Further, Busemann does not consider drag due to a wing of finite span, and wing tip effects are not taken into account. Thus, considering only the above limitations of an initially promising concept, it is understandable that the Busemann biplane has not found application in the design of aircraft capable of supersonic speeds.

Busemann's principle of "wave cancellation" wherein shock waves produced by one wing are cancelled by an expansion pressure wave produced on the adjacent wing is relevant in that the present invention utilizes the general principle of wave cancellation as indicated by a similarity in sectional shapes. Busemann, as his designating it a biplane implies, was envisioning an aircraft with two wings extending horizontally in the configuration of supersonic biplanes.

The present invention is distinguished from Busemann's concept in that it represents an aerodynamic structure having vertically extending legs (of Busemann-type streamwise section) attached to a relatively flat top plate with the bottom area between the legs remaining open. A shock wave expansion system is established between the vertical legs which through shock cancellation minimizes the wave drag of these legs.

With the top plate integrated into the bottom of the structure of aircraft, the present invention creates lift at supersonic speeds even when the wing is at zero incidence relative to the free-stream direction. This lift is caused by the shock wave expansion system acting against the bottom surface of the wing structure.

The vertical orientation of the wave cancellation structure (legs) and the lift generated by the action of the shock wave expansion system as caused by these legs constitutes a significant departure from Busemann; the fact that the lift is related to the volume of the legs is a departure from customary supersonic design practice, where volume and wave drag are synonymous.

BRIEF SUMMARY OF THE INVENTION

The present invention relates to an aerodynamic structure which when included in the design of an aircraft capable of flight at supersonic speeds, provides the aircraft with high lift/drag ratios at the supersonic design speed of the aircraft.

In a preferred embodiment, the present aerodynamic structure has the general shape of a geometrical structure in which two vertical legs, each of which has a cross-sectional shape of an isosceles triangle, are spaced apart and attached to a relatively flat over-plate with their vertices facing inwards, the plate is in turn integrated into the underside of the aircraft with the longitudinal axis of the legs and the aircraft having a parallel relation.

The present aerodynamic structure features a wave cancellation system wherein the shock-expansion pressure field set up between the vertical legs acts to minimize the wave drag of those legs and also provides lift by having these pressures act against the lower surface of the top plate. This is highly efficient lift as it is generated at zero plate incidence and thus does not contain a drag component.

There is some wave drag associated with this lift arising from the fact that some of the air captured by the system spills around the lower edges of the legs, and as a result the pressure recovery on the aft-facing slopes of the vertical legs remains incomplete. The "spillage" on the other hand is the equivalent of downwash on ordinary wings representing the basic mechanism of lift generation through imparting a downward momentum on a finite mass of air. This means that in the present system one can no longer distinguish between drag due to lift and drag due to volume as lift is volume-generated.

In some aircraft designs, incorporating the present aerodynamic structure, flow separation over the interior surfaces may take place. However, standard boundary layer control techniques, well known to those skilled in the art, can be employed to preclude any flow separation.

It is a primary object of the invention to provide an aerodynamic structure, which when incorporated into the design of a supersonic aircraft, will provide the aircraft with a higher lift/drag ratio than has been obtainable in prior aircraft.

Another object of the invention is to provide an aerodynamic structure which when included in the design of a supersonic aircraft creates lift at supersonic speeds by means of a pressure field generated by a shock-expansion system.

Although the characteristic features of the present invention are particularly pointed out in the appended claims, the invention itself, also the manner in which it may be carried out, will be better understood by referring to the following description taken in conjunction with the accompanying drawing forming part of this application.

BRIEF DESCRIPTION OF THE DRAWINGS

A preferred embodiment of the present invention is illustrated in the drawings, in which.

DETAILED DESCRIPTION OF THE INVENTION

Shock wave cancellation provides a substantial reduction in wave drag and when combined with additional lift, the performance of a supersonic aircraft is greatly improved.

Figure 1:
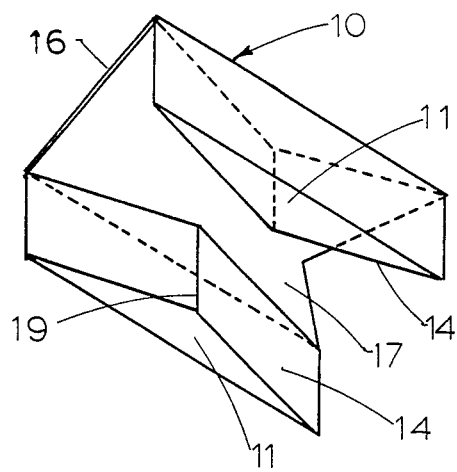
FIG. 1 is a isometric drawing showing details of one form of the present invention.
Figure 4:
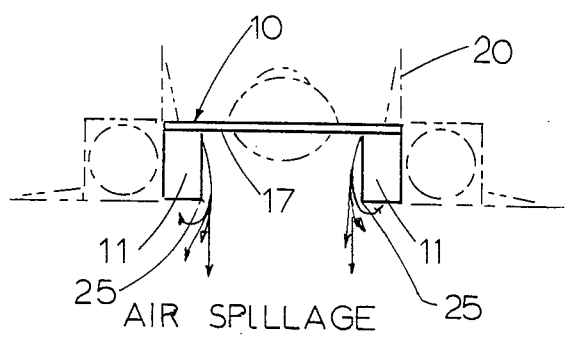
FIG. 4 is an end view of the invention as shown in FIG. 2.

Referring to FIG. 1, a preferred embodiment of the present invention in an aerodynamic structure 10 is shown. The structure can be integrated into a supersonic aircraft 20 of the general configuration shown in FIGS. 2, 3 and 4 to provide the aircraft 20 with a relatively high lift/drag ratio, as compared to the ratio for "conventional" supersonic aircraft.

The aerodynamic structure 10 comprises two air flow altering double-wedge airfoils or legs 11, having facing symmetrical wedge air deflecting surfaces 14 internal to the aerodynamic structure 10, with each double-wedge airfoil 11 attached to a relatively flat surface 17 of an over-plate 16, which may be the bottom of the aircraft in which the aerodynamic structure is incorporated. The single-wedge airfoils extend vertically from the flat surface 17 of the aerodynamic structure 10 to form therewith a modified U-channel configuration oriented with the bottom open. Each airfoil is configured in cross-section substantially as a triangle having an apex 19 extending vertically from the over-plate 16.

Figure 2:
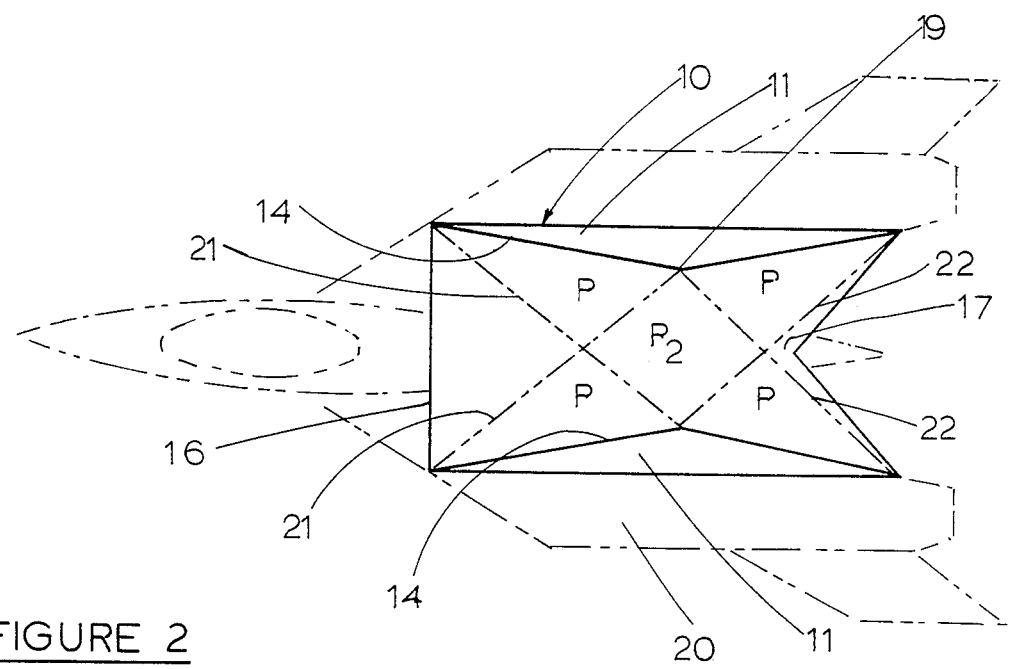
FIG. 2 is a bottom view of the present invention integrated into a phantom aircraft.
Figure 3:
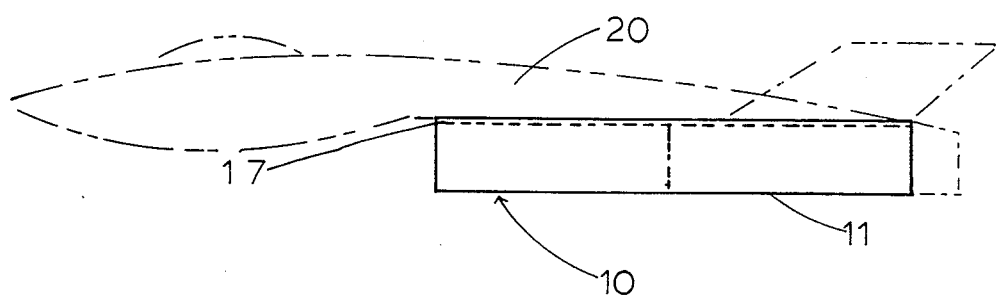
FIG. 3 is a side view of the invention as shown in FIG. 2.

When the aerodynamic structure 10 is integrated into an aircraft 20, as shown in FIG. 2, and the aircraft 20 is operating at its design speed of Mach Number, shock wave cancellation occurs between the symmetrical wedge surfaces 14. That is, at the design Mach Number, the ramp shock waves 21 emanating from the aerodynamic structure 10 are cancelled by expansion waves 22 on the opposite wedge surfaces 14. During shock wave cancellation, high pressure fields are generated between the wedge airfoils 11, and beneath the over-plate 16. The air passing between the legs is compressed, and the resultant pressure field produces a force which acts against the bottom of the over-plate and as such constitutes a lifting force.

Referring now to FIG. 2, high pressure fields generated by the shock expansion waves 21 and 22 are shown as P and $P_2$ with the pressures in $P_2$ being about twice the unit pressure found in the areas designated P. These pressures act between the single-wedge airfoils 11 and against the bottom surface 17 of the over-plate 16 which, in turn, acts to produce lift at zero incidence, but without any drag component.

While the present invention has been described particularly as to the structural features of a specific aerodynamic structure 10, it is understood that other shapes of aerodynamic structures can be tailored for other aircraft configurations. For example, a second aerodynamic structure (not shown) might have three legs or body members extending vertically in a parallel relationship from a relatively flat plate, with two outer legs having the top view shape of an isosceles triangle and the center leg having a top view diamond shape with the vertices or reflecting surfaces of the isosceles triangles facing each other. A third aerodynamic structure (not shown) might have three legs or body members extending vertically in a parallel relationship from a relatively flat plate, with two outer legs being substantially flat reflection plates and the center leg having a diamond shape with the vertices or reflecting surfaces of the diamond shape center leg facing the reflection plates.

It is understood that variations or modifications of the present invention which lie within the scope of the appended claims are fully contemplated.

I claim:

1. In an aircraft of supersonic design having a relatively flat undersurface, an aerodynamic structure for increasing the overall lift-to-drag ratio at the design speed of the aircraft, comprising:

a pair of mutually opposed air flow altering members extending in a generally vertical direction downwardly from said undersurface of said aircraft to capture air flow within the space confined between said opposed airflow altering surfaces and said undersurface of said aircraft, said air flow altering members generating mutually directed and opposed ramp shock waves between the respective surfaces at the design speed, such shock waves in turn generating pressures directed against the confined space of the undersurface of said aircraft resulting in generation of a lift component on said aircraft, and producing thereon an enhanced lift-to-drag ratio.

2. An aerodynamic structure as in claim 1 wherein such shock waves are cancelled by expansion waves generated in the air exiting end of the air flow altering members thereby minimizing drag caused by said air flow altering members.

3. An aerodynamic structure according to claim 2 wherein said vertically oriented air flow altering members have a generally triangular cross-sectional shape in a horizontal plane, with the obtuse apex angle thereof forming the surface being arranged in opposition one to the other to generate shock waves on air flowing between such surfaces, whereby said air flow altering members generate pressure with minimum drag through shock wave cancellation.

4. In an aircraft of supersonic design having a relatively flat undersurface, an aerodynamic structure for increasing the overall lift-to-drag ratio at the design speed of the aircraft comprising:

a pair of mutually opposed air flow altering members in the form of a Busemann biplane arrangement extending in a generally vertical direction downwardly from said undersurface of said aircraft to capture airflow within the space confined between said opposed airflow altering surfaces and said undersurface of said aircraft, said air flow altering members generating mutually directed and opposed ramp shock waves between the respective surfaces at the design speed, such shock waves in turn generating pressures directed against the confined space of the undersurface of said aircraft thereby generating a lift component on said aircraft with minimal incidence, thereby producing an enhanced lift-to-drag ratio on said aircraft.

5. An aerodynamic structure according to claim 4 wherein the surfaces of said air flow altering members, arranged in opposition each to the other to generate shock waves on air flowing therebetween, have a generally triangular cross-sectional configuration, with the obtuse angle apex thereby forming the limit of the shock wave generating surface, and with the acute angle apices thereof forming respective leading and trailing edges of the members.

6. An aerodynamic structure according to claim 4 wherein the surfaces of said air flow altering members, arranged in opposition each to the other to generate shock waves on air flowing therebetween, have a generally triangular cross-sectional configuration, with the obtuse angle apex thereof forming the limit of the shock wave generating surface, and with the acute angle apices thereof forming respective leading and trailing edges of the members.

7. In an aircraft of supersonic design having a relatively flat undersurface, an aerodynamic structure for increasing the overall lift-to-drag ratio at the design speed of the aircraft comprising:

a pair of mutually opposed air flow altering members in the form of a Busemann biplane arrangement extending in a generally vertical direction downwardly from said undersurface of said aircraft to capture airflow within the space confined between said opposed airflow altering surfaces and said undersurface of said aircraft, said air flow altering members generating mutually directed and opposed ramp shock waves between the respective surfaces at the design speed, such shock waves in turn generating expansion shock waves directed against the confined space of the undersurface of said aircraft thereby imparting a downward momentum on a finite and impinging mass of underlying air to generate a resultant lift component on said aircraft with minimal incidence, thereby producing an enhanced lift-to-drag ratio on said aircraft.

8. In an aircraft of supersonic design having a relatively flat undersurface, an aerodynamic structure for increasing the overall lift-to-drag ratio at the design speed of the aircraft, comprising:

a pair of mutually opposed air flow altering members extending from said undersurface of said aircraft in a generally vertical direction downwardly to capture airflow within the space confined between said opposed airflow altering surfaces and said undersurface of said aircraft, each of said air flow altering members, having at least one substantially triangular cross-section forming a wedge shaped air deflecting surface, and being arranged substantially in opposition with the other air flow altering member, and generating mutually directed and opposed ramp shock waves between the respective surfaces at the design speed, such shock waves being cancelled by expansion waves generated in the aft expanding section of the airflow altering members, thereby minimizing drag caused by said flow altering members, and in turn generating a high pressure field between said air flow altering members and said undersurface of said aircraft, and resulting in a lift component, whereby an enhanced lift-to-drag ratio is produced on said aircraft.

9. An aerodynamic structure as in claim 8 wherein such shock waves are cancelled by expansion waves generated in the air exiting end of the air flow altering members thereby minimizing drag caused by said air flow altering members.

10. In an aircraft of supersonic design having a fuselage with an undersurface, an aerodynamic structure for increasing the overall lift-to-drag ratio at the design speed of the aircraft comprising:

a relatively flat plate member on the undersurface of said fuselage;

a pair of mutually opposed air flow altering members extending in a generally vertical direction downwardly from said flat plate member of said aircraft to capture air flowing within the space confined between said opposed airflow altering surfaces and said flat plate member of said aircraft, said air flow altering members, being substantially triangular in cross-section with opposing air deflecting surfaces for generating mutually directed and opposed ramp shock waves between the respective surfaces at the design speed, such shock waves in turn generating expansion shock waves directed against the confined space of the undersurface of said flat plate member thereby generating a high pressure field between said air flow altering members and said flat plate member, and imparting a downward momentum on an impinging finite mass of underlying air to generate a resultant lift component on said flat plate member and said aircraft at minimal incidence, thereby producing an enhanced lift-to-drag ratio on said aircraft.

* * * * *